(12) United States Patent
Duthille et al.

(10) Patent No.: US 12,269,576 B2
(45) Date of Patent: Apr. 8, 2025

(54) METHOD FOR MANUFACTURING AT LEAST ONE PORTION OF A BOX STRUCTURE OF AN AIRCRAFT COMPRISING A FORMING STEP, AND A CENTRAL WINGBOX THUS OBTAINED

(71) Applicants: Airbus Operations SAS, Toulouse (FR); Airbus Operations LTD, Filton Bristol (GB); Airbus Operations S.L., Getafe (ES)

(72) Inventors: Bertrand Duthille, Toulouse (FR); Jonathan Price, Filton Bristol (GB); Jago Pridie, Toulouse (FR); Jose Manuel Menendez Martin, Getafe (ES)

(73) Assignees: Airbus Operations SAS, Toulouse (FR); Airbus Operations LTD, Filton Bristol (GB); Airbus Operations S.L., Getafe (ES)

( * ) Notice: Subject to any disclaimer, the term of this patent is extended or adjusted under 35 U.S.C. 154(b) by 259 days.

(21) Appl. No.: 18/164,119

(22) Filed: Feb. 3, 2023

(65) Prior Publication Data
US 2023/0264804 A1   Aug. 24, 2023

(30) Foreign Application Priority Data
Feb. 22, 2022   (FR) ...................................... 2201536

(51) Int. Cl.
*B64C 1/26* (2006.01)
*B29C 70/30* (2006.01)
*B29D 99/00* (2010.01)

(52) U.S. Cl.
CPC ............... *B64C 1/26* (2013.01); *B29C 70/30* (2013.01); *B29D 99/0014* (2013.01)

(58) Field of Classification Search
CPC .. B64C 1/26; B64C 1/00; B29C 70/30; B29D 99/0014
See application file for complete search history.

(56) References Cited

U.S. PATENT DOCUMENTS

2013/0240130 A1*  9/2013  Funnell ................. B29C 70/446
                                                        156/189
2019/0256185 A1   8/2019  Pridie
(Continued)

FOREIGN PATENT DOCUMENTS

EP   3115185 A1   1/2017
EP   3530444 A1   8/2019
(Continued)

OTHER PUBLICATIONS

French Search Report dated Oct. 4, 2022; priority document.

*Primary Examiner* — Justin M Benedik
(74) *Attorney, Agent, or Firm* — Greer, Burns & Crain, Ltd.

(57) ABSTRACT

A method for manufacturing at least a portion of a box structure obtained from an outer skin and a plurality of sections each having a joining face in contact with the outer skin. The method comprises a step of positioning the sections on a mold, a step of obtaining a flat fiber preform having a thickness substantially equal to the outer skin, a step of placing a central portion of the fiber preform on the sections positioned on a first face of the mold and a step of forming a lateral extension of the fiber preform to press the fiber preform against a forming surface. A central wingbox obtained by the method is provided and a forming tool for carrying out the method.

14 Claims, 4 Drawing Sheets

(56) References Cited

U.S. PATENT DOCUMENTS

2020/0001516 A1* 1/2020 Chapman ................ B29C 70/56
2020/0180241 A1* 6/2020 Penven .............. B29D 99/0025

FOREIGN PATENT DOCUMENTS

EP   3666507 A1   6/2020
WO   2008020158 A2   2/2008

* cited by examiner

METHOD FOR MANUFACTURING AT LEAST ONE PORTION OF A BOX STRUCTURE OF AN AIRCRAFT COMPRISING A FORMING STEP, AND A CENTRAL WINGBOX THUS OBTAINED

CROSS-REFERENCES TO RELATED APPLICATIONS

This application claims the benefit of the French patent application No. 2201536 filed on Feb. 22, 2022, the entire disclosures of which are incorporated herein by way of reference.

FIELD OF THE INVENTION

The present application relates to a method for manufacturing at least one portion of an aircraft box structure including a forming step and to a central wingbox thus obtained.

BACKGROUND OF THE INVENTION

Figure 1:
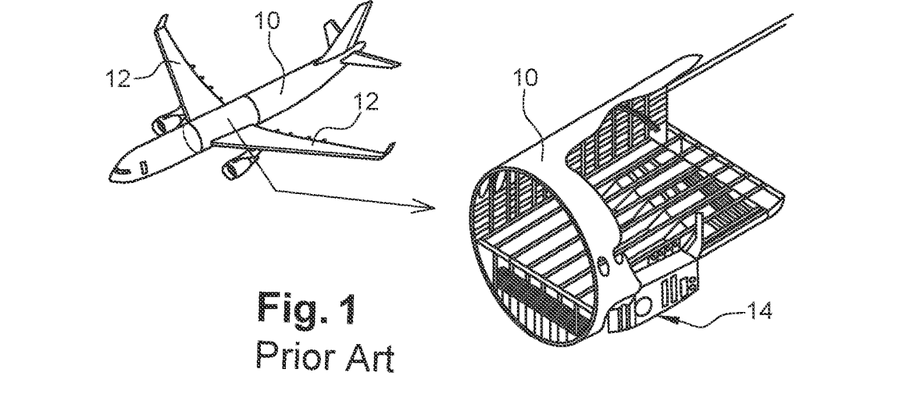
FIG. 1 is a perspective view of an aircraft.

As shown in FIG. 1, an aircraft includes a fuselage 10, wings 12, and a central wingbox 14 connecting the wings 12 and the fuselage 10. According to one embodiment shown in FIG. 2, the central wingbox 14 includes a top panel 16, a bottom panel 18, a front spar 20, and a rear spar 22.

Figure 2:
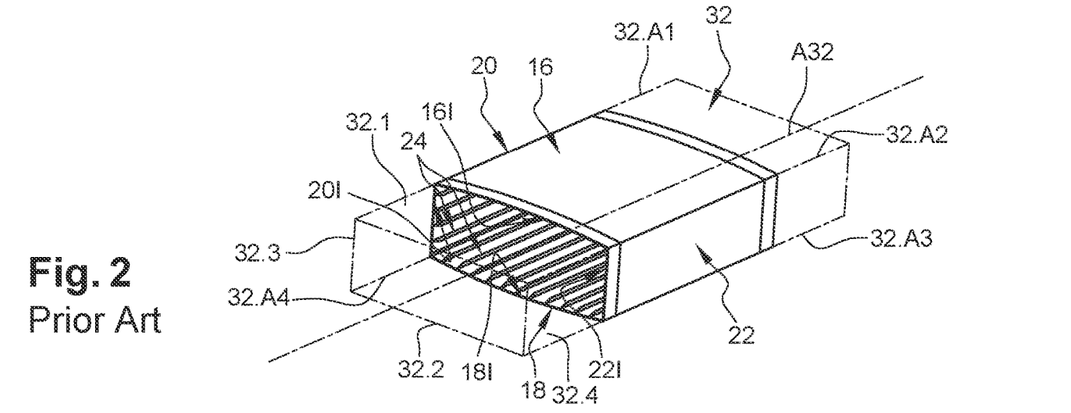
FIG. 2 is a perspective view of a central wingbox and a mold showing one embodiment according to the prior art.

The top and bottom panels 16, 18, as well as the front and rear spars 20, 22, each have an internal face (oriented towards the center of the central wingbox), referenced respectively 161, 181, 201 and 221, that are reinforced by stiffening members 24 on the internal faces thereof.

Figure 3:
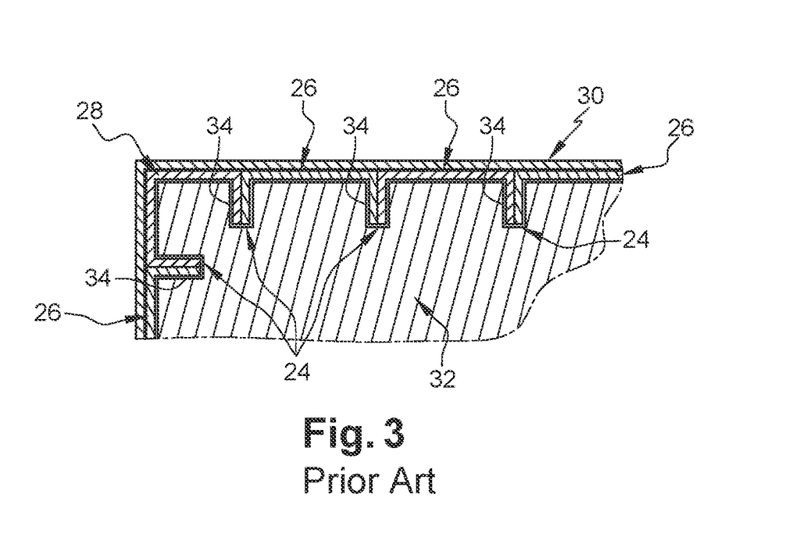
FIG. 3 is a longitudinal cross section of the central wingbox shown in FIG. 2.

As shown in FIG. 3, the central wingbox 14 is obtained from a plurality of U- or C-shaped sections 26, 28 made of composite material, and an outer skin 30 of fiber reinforcements attached to the sections 26, 28. The plurality of U- or C-shaped sections 26, 28 are positioned about a mold 32 (visible in FIG. 2 as a dot-and-dash line and partially in FIG. 3).

The mold 32 has four faces 32.1 to 32.4 connected in pairs at the four edges 32.A1 to 32.A4, shaped in the same manner as the internal faces 161, 181, 201 and 221 of the top and bottom panels 16, 18 and the front and rear spars 20, 22 of the central wingbox 14. According to one layout, the mold 32 has a pivot axis A32, parallel to the edges 32.A1 to 32.A4, to allow the fiber reinforcements to be wound.

The mold 32 includes slots 34 that are formed parallel to the edges 32.A1 to 32.A4 in the faces 32.1 to 32.4 of the mold 32, with one slot 34 for each stiffening member 24.

A method for manufacturing a central wingbox 14 comprises a step of obtaining sections 26, 28, a step of positioning the sections 26, 28 on the mold 32, a step of obtaining the outer skin 30 by winding fiber reinforcements about the mold 32, a step of applying a polymerization covering, a polymerization step, and a demolding step.

The step of obtaining the outer skin 30 by winding fiber reinforcements is relatively long and has a significant impact on the cost of producing the central wingbox 14.

Document WO2008020158 also proposes a method for manufacturing a central wingbox.

According to a first embodiment illustrated in FIGS. 1 to 3, the central wingbox is made by assembling four parts. According to this first embodiment, to obtain a stiffened panel, a tool comprises a main mold with hollow shapes designed to receive secondary molds in which T- or L-shaped fiber sections are positioned. Once the secondary molds containing the fiber sections have been positioned on the main mold, the outer skin is obtained by placing a flat preform on the main mold. Finally, the flat preform is covered with a counter-mold designed to press the flat preform against the main mold during a polymerization step. According to one layout, the stiffened panel comprises two flanges folded to 90° on both sides of the central portion thereof provided with stiffening members. According to this layout, the main mold has two flanks shaped like the flanges of the stiffened panel to be obtained and the counter-mold is U-shaped to deform the flat preform so that the flat preform matches the shapes of the main mold. This first embodiment is not satisfactory because, since the central portion of the preform is not held when the flanges thereof are folded, it is not possible to use this first embodiment to obtain a stiffened panel with a single flange.

Figure 6:
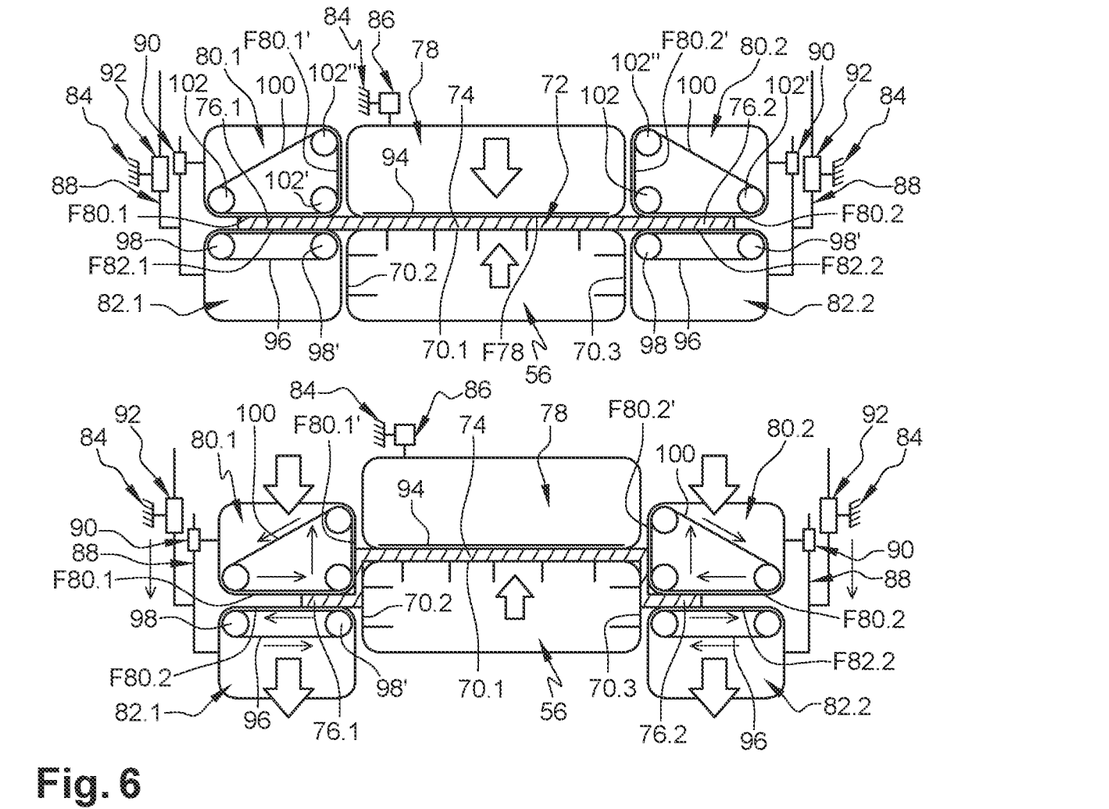
FIG. 6 is a schematic view of the different steps for positioning an outer skin showing another embodiment of the invention.

According to a second embodiment shown in FIG. 6, to obtain a continuous outer skin, the tool comprises a main mold comprising four faces provided with hollow shapes designed to receive secondary molds in which fiber sections are positioned. After the secondary molds containing the fiber sections have been placed on the main mold, the outer skin is obtained by winding fiber reinforcements about the main mold. Even if this second embodiment obviates the assembly steps, it is not satisfactory since, as indicated above, this fiber reinforcement winding step is relatively long and has a significant impact on the costs of producing the central wingbox.

The present invention is intended to overcome some or all of the drawbacks in the prior art.

SUMMARY OF THE INVENTION

For this purpose, the invention relates to a method for manufacturing at least one portion of a box structure comprising at least one stiffened main wall extended by at least one flange and/or by at least one stiffened secondary wall, the portion of the box structure being obtained from an outer skin made of a composite material and from a plurality of sections made of a composite material, each having a joining face in contact with the outer skin, the method comprising a step of obtaining the sections, a step of positioning the sections on a mold comprising at least a first face on which the sections are positioned, a step of obtaining a flat fiber preform having a thickness substantially equal to the outer skin, a step of placing a central portion of the fiber preform on the sections positioned on the first face of the mold, the fiber preform having at least one lateral extension extending the central portion, a step of forming the lateral extension, a step of applying at least one polymerization covering, at least one polymerization step, and at least one demolding step.

According to the invention, during the forming step, the main portion is held against the joining faces of the sections positioned on the first face of the mold by a main jaw. Additionally, the lateral extension of the fiber preform is folded against a forming surface, substantially perpendicular to the first face of the mold, by at least one secondary jaw designed to move in translation parallel to the forming surface.

The fact that the outer skin is made from a flat fiber preform that is then deformed in a forming step reduces production costs and increases production rates. According to another advantage, the method according to the invention can provide stiffened panels with a single flange or a single stiffened secondary wall. The method according to the invention also optimizes the contact between the joining faces of the sections and the fiber preform.

According to another feature, during the forming step, the lateral extension of the fiber preform is held between a pair of secondary jaws designed to move in translation in at least one direction parallel to the forming surface.

According to another feature, the fiber preform includes right- and left-hand lateral extensions positioned on both sides of the main portion.

According to another feature, the forming surface corresponds to joining faces of sections positioned on a side face of the mold.

The invention also relates to a method for manufacturing a central wingbox comprising a top panel, a bottom panel, a front spar and a rear spar, characterized in that the central wingbox comprises:

- a first portion comprising the top panel, the front and rear spars, and the first and second flanges, the first flange being connected to the front spar, approximately perpendicular to the front spar and extending the front spar in the direction opposite the rear spar, the second flange being connected to the rear spar, approximately perpendicular to the rear spar and extending the rear spar in the direction opposite the front spar, the first portion being obtained using the method having one of the aforementioned features,
- a second portion comprising a stiffened panel shaped like the bottom panel and including first and second extensions arranged on both sides of the bottom panel, the first extension being connected to the first flange, the second extension being connected to the second flange.

The invention also relates to a central wingbox obtained using the manufacturing method and a forming tool to manufacture at least one portion of a box structure comprising at least one stiffened main wall extended by at least one flange and/or by at least one stiffened secondary wall. This tool is characterized in that it comprises:

- a mold having at least a first face shaped like the stiffened main wall and designed to bear sections,
- at least one main jaw comprising a contact face substantially parallel to the first face of the mold, designed to hold a main portion of a fiber preform pressed against sections positioned on the first face of the mold,
- at least one secondary jaw designed to fold a lateral extension of the fiber preform against a forming surface and to move in at least one direction parallel to the forming surface.

According to another feature, the forming tool comprises at least one pair of upstream and downstream secondary jaws each designed to hold a lateral extension of the fiber preform and to move in the direction parallel to the forming surface.

According to another feature, each upstream and downstream secondary jaw comprises a first contact face, the first contact faces of the upstream and downstream secondary jaws being designed to be arranged on both sides of the fiber preform, substantially parallel to each other for each pair and perpendicular to a face of the mold against which the lateral extension held by the upstream and downstream secondary jaws is to be positioned.

According to another feature, each upstream secondary jaw comprises a second contact face oriented towards the mold, substantially parallel to the face of the mold against which the lateral extension held by the upstream and downstream secondary jaws is to be positioned, in operation the second contact face being spaced apart from the sections positioned on the face of the mold by a distance substantially equal to the thickness of the fiber preform.

According to another feature, each downstream secondary jaw has at least one moving belt on the first contact face thereof.

According to another feature, each upstream secondary jaw has at least one moving belt on the first and/or second contact face thereof.

According to another feature, each upstream secondary jaw has a moving belt stretched between at least three pivoting rollers arranged such that the moving belt moves on the first and second contact faces.

According to another feature, the tool comprises a first pair of secondary jaws designed to cooperate with a right-hand lateral extension of the fiber preform and a second pair of secondary jaws designed to cooperate with a left-hand lateral extension of the fiber preform.

BRIEF DESCRIPTION OF THE DRAWINGS

Other features and advantages are set out in the description of the invention below, given purely by way of example and with reference to the attached drawings, in which.

DETAILED DESCRIPTION OF THE PREFERRED EMBODIMENTS

Figure 4:
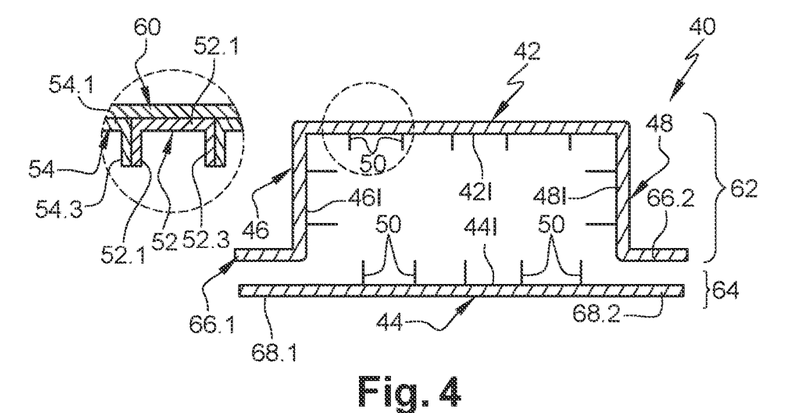
FIG. 4 is a schematic view of a central wingbox showing an embodiment of the invention.

According to one embodiment shown in FIG. 4, a central wingbox 40 includes a top panel 42, a bottom panel 44, a front spar 46, and a rear spar 48.

The top and bottom panels 42, 44 and the front and rear spars 46, 48 have internal faces (oriented towards the center of the central wingbox) referenced respectively 421, 441, 461 and 481.

At least one of the top and bottom panels 42, 44 and the front and rear spars 46, 48 has at least one stiffening member 50, positioned on the internal face 421, 441, 461, 481 thereof. According to one layout, each of the top and bottom panels 42, 44 and each of the front and rear spars 46, 48 has at least one stiffening member 50 on the internal face 421, 441, 461, 481 thereof, and usually a plurality of stiffening members 50 parallel to each other and oriented in a transverse direction.

The central wingbox 40 is made of composite material.

Figure 5:
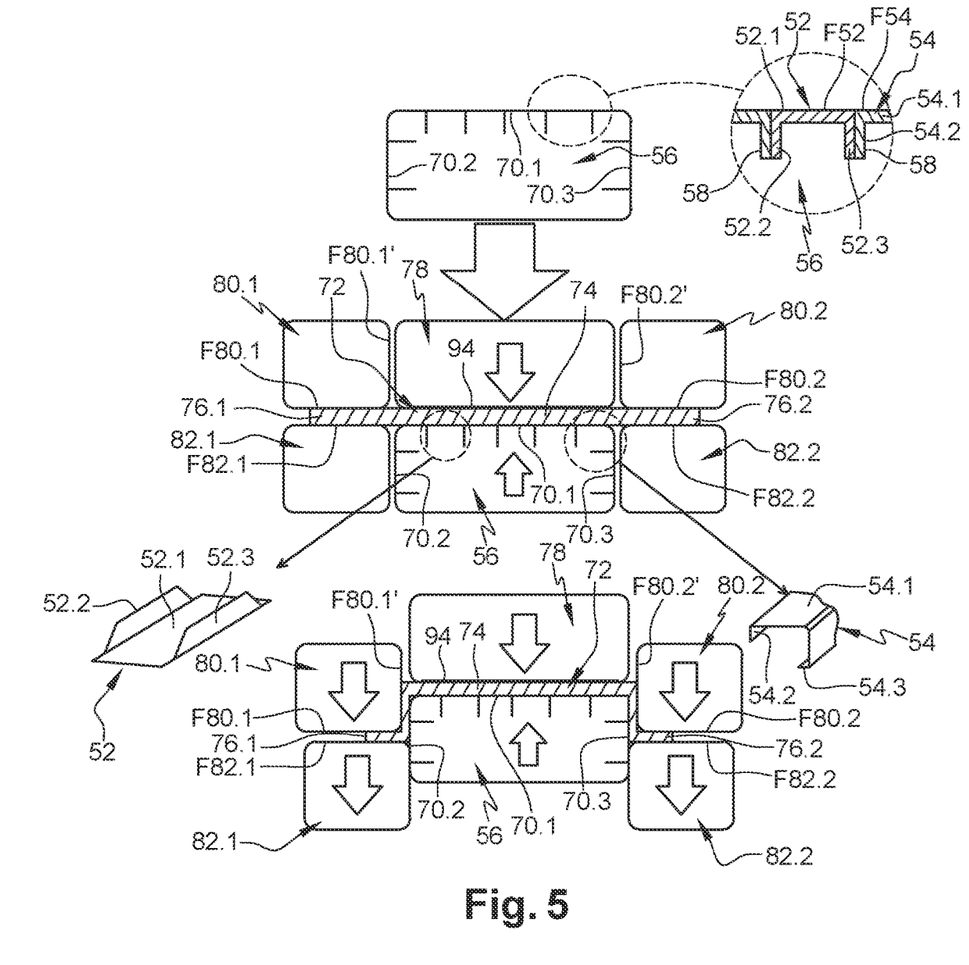
FIG. 5 is a schematic view of the different steps for positioning an outer skin showing one embodiment of the invention.

According to one embodiment, the central wingbox 40 is obtained from a plurality of sections 52, 54 made of composite material, such as U-shaped sections 52, C-shaped sections 54, or L-shaped sections, for example. As shown in FIG. 5, each U-shaped section has a base 52.1 and two flanges 52.2, 52.3 parallel to each other and positioned on both sides of the base 52.1. Each C-shaped section comprises a V-shaped base 54.1 and two flanges 54.2, 54.3 positioned on both sides of the V-shaped base 54.1. The C-shaped sections 54 are positioned at the joining zones of the top/bottom panels 42, 44 and the front/rear spars 46, 48. The U-shaped sections 52 are inserted between the C-shaped sections 54.

According to one layout, each section 52, 54 is obtained from a pre-impregnated fiber preform that may be partially polymerized to preserve the shape thereof.

According to one procedure, the sections 52, 54 are directly attached to at least one mold 56 that has one seat 58, such as a slot, for example, for each stiffening member 50. With U-, C- or L-shaped sections, each seat 58 is designed to receive two adjoining flanges of two juxtaposed U-shaped sections 52 and/or C-shaped sections 54 and/or L-shaped sections.

Alternatively, the sections 52, 54 are positioned on secondary molds attached to the mold 56.

The sections 52, 54 are not described in greater detail as the sections can be identical to the sections in the prior art. Naturally, the sections 52, 54 are not limited to a U-, C- or L-shaped cross section, but can have a T-, I-, L- or other cross section. Regardless of the embodiment, a section 52, 54 is made of a composite material and comprises at least one joining face F52, F54 that is exposed when the section 52, 54 is attached, directly or indirectly, to the mold 56.

In addition to the sections 52, 54, the central wingbox 40 comprises an outer skin 60 made of composite material, in contact with the joining faces F52, F54 of the sections 52, 54, as shown in FIG. 4.

According to a first embodiment, the central wingbox 40 comprises first and second assembled portions 62, 64, as shown in FIG. 4. According to one layout, the first portion 62 comprises the top panel 42, the front and rear spars 46, 48, and the first and second flanges 66.1, 66.2, the first flange 66.1 being connected to the front spar 46, approximately perpendicular to the front spar 46 and extending the front spar in the direction opposite the rear spar 48, the second flange 66.2 being connected to the rear spar 48, approximately perpendicular to the rear spar 48 and extending the rear spar in the direction opposite the front spar 46. Thus, the first portion 62 has an approximately omega-shaped cross section in a longitudinal plane.

The second portion 64 includes the bottom panel 44 and first and second extensions 68.1, 68.2 that are arranged on both sides of the bottom panel 44 and that are substantially coplanar with the bottom panel 44.

The first and second portions 62, 64 are assembled by pressing the first flange 66.1 against the first extension 68.1 and the second flange 66.2 against the second extension 68.2, the first and second portions 62, 64 being connected by gluing, by copolymerization, by linking elements such as rivets or bolts for example, or by any other assembly technique.

According to this first embodiment, the mold 56 comprises a top face 70.1 shaped like the internal face 421 of the top panel 42, a first side face 70.2 shaped like the internal face 461 of the front spar 46 and a second side face 70.3, opposite the second side face 70.2, shaped like the internal face 481 of the rear spar 48. The top face 70.1 and the first and second side faces 70.2, 70.3 are designed to receive the sections 52, 54. According to one layout, the faces have seats 58 for receiving the flanges 52.2, 52.3, 54.2, 54.3 of the U-shaped sections 52, the C-shaped sections 54 or the L-shaped sections to form the stiffening members 50.

A method for manufacturing a central wingbox 40 comprises a step of obtaining sections 52, 54, a step of positioning the sections 52, 54 on the mold 56, a step of obtaining a flat fiber preform 72 having a thickness substantially equal to the outer skin 60, a step of placing the flat fiber preform 72 on the joining faces F52, F54 of the sections 52, 54 positioned on the top face 70.1 of the mold 56, a step of forming the flat fiber preform 72 in order to press the preform against the joining faces F52, F54 of the sections 52, 54 positioned on the first and second side faces 70.2, 70.3 of the mold 56, a step of applying at least one polymerization covering, a polymerization step, and a demolding step. The flat fiber preform 72 is dimensioned to form the outer skin 60 of the top panel 42, the front/rear spars 46, 48, and the first and second flanges 66.1, 66.2. Thus, the flat fiber preform 72 comprises a main portion 74 intended to be positioned on the top face 70.1 of the mold 56 as well as right- and left-hand lateral extensions 76.1, 76.2 that are located on both sides of the main portion 74 and that are intended to be positioned on the first and second side faces 70.2, 70.3 of the mold 56 and to form the first and second flanges 66.1, 66.2. Each right- and left-hand lateral extension 76.1, 76.2 extends between a first edge connected to the main portion 74 and a second free edge.

During the forming step, the right- and left-hand lateral extensions 76.1, 76.2 of the fiber preform 72 are simultaneously and equally pressed against the joining faces F52, F54 of the sections 52, 54 positioned on the first and second side faces 70.2, 70.3 of the mold 56 in order to balance the forces on both sides of the main portion 74 of the fiber preform 72.

According to the first embodiment, the second portion 64 comprises a stiffened panel shaped like the bottom panel 44, having first and second extensions 68.1, 68.2.

Figure 7:
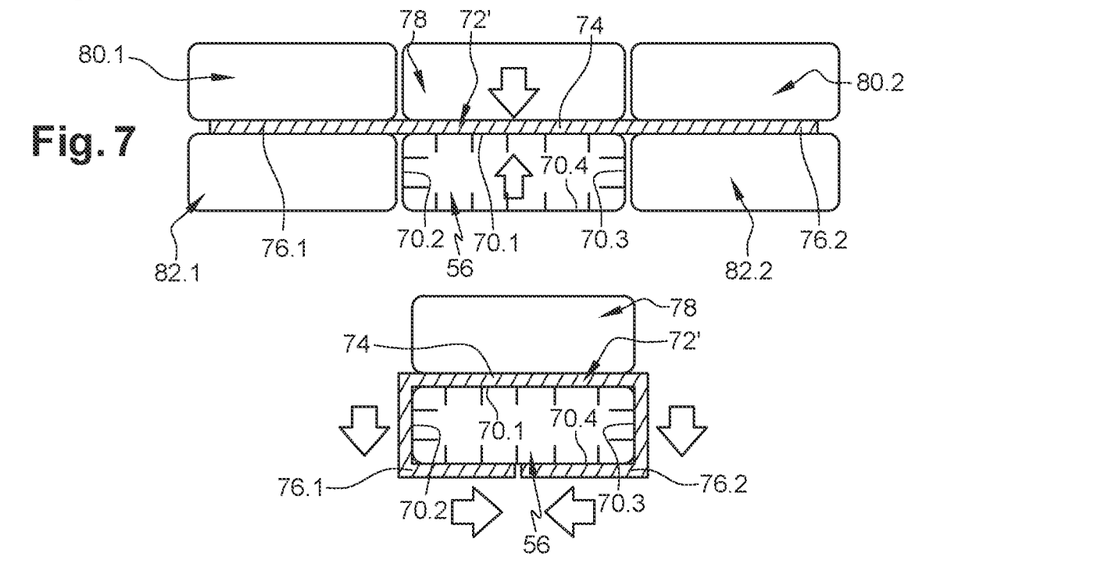
FIG. 7 is a schematic view of the different steps for positioning an outer skin showing another embodiment of the invention.

According to another embodiment shown in FIG. 7, the mold 56 comprises a top face 70.1 shaped like the internal face 421 of the top panel 42, a first side face 70.2 shaped like the internal face 461 of the front spar 46, a second side face 70.3 shaped like the internal face 481 of the rear spar 48, and a bottom face 70.4 shaped like the internal face 441 of the bottom panel 44. The top and bottom faces 70.1, 70.4 and the first and second side faces 70.2, 70.3 are designed to receive the sections 52, 54. According to one layout, the faces have slots 58 for receiving the flanges 52.2, 52.3, 54.2, 54.3 of the U-shaped sections 52, the C-shaped sections 54 or the L-shaped sections to form the stiffening members 50.

A method for manufacturing a central wingbox 40 comprises a step of obtaining sections 52, 54, a step of positioning the sections 52, 54 on the mold 56, a step of obtaining a flat fiber preform 72' having a thickness substantially equal to the outer skin 60, a step of placing the flat preform 72' on the joining faces F52, F54 of the sections 52, 54 positioned on the top face 70.1 of the mold 56, a step of forming the flat fiber preform 72' in order to press the preform against the joining faces F52, F54 of the sections 52, 54 positioned on the first and second side faces 70.2, 70.3 then against the joining faces F52, F54 of the sections 52, 54 positioned on the bottom face 70.4 of the mold 56, a step of applying at least one polymerization covering, a polymerization step, and a demolding step. The flat fiber preform 72' is dimensioned to form the outer skin 60 of the top and bottom panels 42, 44 and the front and rear spars 46, 48. Thus, the flat fiber preform 72' comprises a main portion 74 intended to be positioned on the top face 70.1 of the mold 56 as well as right- and left-hand lateral extensions 76.1, 76.2 that are located on both sides of the main portion 74 and that are intended to be positioned on the first and second side faces 70.2, 70.3 and on the bottom face 70.4 of the mold 56. During the forming step, the right- and left-hand lateral extensions 76.1, 76.2 of the fiber preform 72' are simultaneously and equally pressed against the joining faces F52, F54 of the sections 52, 54 positioned on the first and second side faces 70.2, 70.3 then against the faces of the sections 52, 54 positioned on the bottom face 70.4 of the mold 56 in order to balance the forces on both sides of the main portion 74 of the fiber preform 72'.

Regardless of the embodiment, the mold 56 has at least first and second faces, approximately forming a right angle, shaped like the internal faces of an adjoining top or bottom panel 42, 44 and an adjoining front or rear spar 46, 48.

Additionally, the method for manufacturing a central wingbox 40 comprises a step of obtaining sections 52, 54, a step of positioning the sections 52, 54 on the mold 56 having at least first and second faces 70.1, 70.2, 70.3 on which the sections 52, 54 are positioned, a step of obtaining a flat fiber preform 72, 72' having a thickness substantially equal to the outer skin 60, a step of placing the fiber preform 72, 72' on the sections 52, 54 positioned on the first face of the mold 56, a step of forming the fiber preform 72, 72' in order to press the preform against the sections 52, 54 positioned on at least the second face of the mold 56, a step of applying at least one polymerization covering, at least one polymerization step, and at least one demolding step. Thus, the fiber preform 72, 72' includes a main portion 74 designed to be positioned on the first face of the mold 56 and at least one lateral extension 76.1, 76.2 designed to be positioned at least on the second face of the mold 56.

Regardless of the embodiment, the fiber preform 72, 72' is made using flat preform techniques such as fiber ply draping. These techniques enable preforms to be obtained quickly and at a much lower production cost than a winding technique.

According to one layout, the fiber preform 72, 72' comprises a main portion 74 and two lateral extensions 76.1, 76.2, positioned on both sides of the main portion 74, that are simultaneously and equally pressed against the sections 52, 54 positioned on at least two opposing faces of the mold 56. This layout balances the forces on both sides of the main portion 74 during the forming step.

According to a first procedure, the fiber preform 72, 72' is folded along at least one fold line corresponding to an edge connecting a top or bottom panel 42, 44 and a front or rear spar 46, 48 during the forming step.

According to another procedure shown in FIGS. 5 to 7, each lateral extension 76.1, 76.2 is gradually pressed against the sections 52, 54 positioned on at least one face of the mold 56, starting from the first edge of the lateral extension 76.1, 76.2 towards the second free edge thereof. This solution ensures that each lateral extension 76.1, 76.2 is in good contact with the sections 52, 54.

The manufacturing method described above is more specifically suited to manufacturing the first portion 62 of the central wingbox 40 shown in FIG. 4. Alternatively, the manufacturing method shown in FIG. 7 can be used to obtain a central wingbox without assembly.

Although described in relation to a central wingbox, the manufacturing method could be used to manufacture other box structures, such as a wingbox, for example.

To implement the forming step, a forming tool comprises, in addition to the mold 56, at least one main jaw 78 designed to press the main portion 74 of the fiber preform 72, 72' against the sections 52, 54 positioned on a first face of the mold 56, in particular the top face 70.1 thereof, and at least one pair of secondary jaws for each lateral extension designed to hold the lateral extension 76.1, 76.2 of the fiber preform 72, 72' and to move in at least one direction parallel to the second face of the mold.

According to one layout, the forming tool comprises a first pair of secondary jaws 80.1, 82.1 designed to cooperate with the right-hand lateral extension 76.1 and a second pair of secondary jaws 80.2, 82.2 designed to cooperate with the left-hand lateral extension 76.2.

The main jaw 78 includes a contact face F78 substantially parallel to the first face 70.1 of the mold 56. The main jaw 78 is designed to occupy a first position in which the main jaw 78 is withdrawn from the mold 56 so as to enable placement of the fiber preform 72, 72' and a second position in which the main jaw 78 is moved towards the mold 56 so as to keep the perform pressed against the sections 52, 54 positioned on the first face of the mold 56.

According to one embodiment shown in FIG. 6, the forming tool includes a structure 84 and at least a first joint 86 connecting the main jaw 78 and the structure 84 that is designed to allow the main jaw 78 to move between the first position and the second position. The first joint 86 may for example be a sliding link.

Each secondary jaw 80.1, 82.1, 80.2, 82.2 has a first contact face F80.1, F82.1, F80.2, F82.2. These first contact faces of the secondary jaws are substantially parallel to each other in each pair, perpendicular to the second or third side face 70.2, 70.3 of the mold 56, and designed to be arranged on both sides of the fiber preform 72, 72'. For each pair, at least one of the two secondary jaws 80.1, 82.1, 80.2, 82.2 is movable in a direction perpendicular to the first contact faces F80.1, F82.1, F80.2, F82.2 between a first position in which the two secondary jaws 80.1, 82.1, 80.2, 82.2 are withdrawn from each other so as to allow the fiber preform 72, 72' to be placed between the two secondary jaws 80.1, 82.1, 80.2, 82.2 and a second position in which the two secondary jaws 80.1, 82.1, 80.2, 82.2 are brought together and the first contact faces F80.1, F82.1, F80.2, F82.2 of the two secondary jaws 80.1, 82.1, 80.2, 82.2 are in contact with and hold the fiber preform 72, 72'.

According to one embodiment, the forming tool comprises, for each pair of secondary jaws 80.1, 82.1, 80.2, 82.2, a support 88 and at least one second joint 90 that connects the support 88 and one of the secondary jaws 80.1, 82.1, 80.2, 82.2 and is designed to allow the secondary jaws to move between the first position and the second position. The second joint 90 may for example be a sliding link.

According to one embodiment shown in FIGS. 5 and 6, each pair of secondary jaws 80.1, 82.1, 80.2, 82.2 is designed to move in translation in a direction parallel to the face of the mold 56 on which the lateral extension 76.1, 76.2 held by the pair of secondary jaws 80.1, 82.1, 80.2, 82.2 is to be positioned. Where there are first and second pairs of secondary jaws 80.1, 82.1, 80.2, 82.2, the first pair of secondary jaws 80.1, 82.1, holding the right-hand lateral extension 76.1 of the fiber preform 72, 72', moves in translation parallel to the first side face 70.2 of the mold 56 and the second pair of secondary jaws 80.2, 82.2, holding the left-hand lateral extension 76.2 of the fiber preform 72, 72', moves in translation parallel to the second side face 70.3 of the mold 56.

According to another embodiment shown in FIG. 7, each pair of secondary jaws 80.1, 82.1, 80.2, 82.2 is designed to move in translation in two directions, a first direction parallel to the first or second side face 70.2, 70.3 of the mold 56 and a second direction parallel to the bottom face 70.4 of the mold 56.

According to one arrangement, the tool has, for each pair of secondary jaws, at least one sliding link 92 connecting the support 88 and the structure 84 designed to allow the support 88 to move in translation at least in a direction parallel to the first or second side face 70.2, 70.3 of the mold 56.

Each pair of secondary jaws includes an upstream secondary jaw 80.1, 80.2 and a downstream secondary jaw 82.1, 82.2. The concepts "upstream" and "downstream" refer to the direction of movement of the secondary jaws, the upstream secondary jaw 80.1, 80.2 being located upstream of the downstream secondary jaw 82.1, 82.2. According to the example shown in FIGS. 5 and 6, when the fiber preform 72, 72' is positioned against the top face 70.1 of the mold 56, the upstream secondary jaw 80.1, 80.2 is positioned above the right- or left-hand lateral extension 76.1, 76.2 and the downstream secondary jaw 82.1, 82.2 is positioned below the right- or left-hand lateral extension 76.1, 76.2.

Each upstream secondary jaw 80.1, 80.2 comprises a first contact face F80.1, F80.2 oriented towards the downstream secondary jaw 82.1, 82.2 and a second contact face F80.1', F80.2' oriented towards the mold 56 and substantially parallel to the face of the mold 56 against which the lateral extension 76.1, 76.2 held by the upstream and downstream secondary jaws 80.1, 82.1, 80.2, 82.2 is to be positioned. According to one arrangement, when the secondary jaws 80.1, 80.2, 82.1, 82.2 are in the second position, the first contact faces F80.1, F80.2, F80.2, F82.2 of the upstream and downstream secondary jaws are separated by a distance substantially equal to the thickness of the fiber preform 72, 72'. For each upstream secondary jaw 80.1, 80.2, the second contact face F80.1', F80.2' is spaced apart from the sections 52, 54 positioned on the first or second side face 70.2, 70.3 of the mold 56 by a distance substantially equal to the thickness of the fiber preform 72, 72'. Therefore, when moving in translation, each upstream secondary jaw 80.1, 80.2 and more specifically the second contact face F80.1', F80.2' thereof, keeps the fiber preform 72, 72' pressed against the sections 52, 54 positioned on the first or second side face 70.2, 70.3 of the mold 56.

According to a first layout, the fiber preform 72, 72' is not pre-impregnated with resin. In this case, during the movement of the secondary jaws 80.1, 80.2, 82.1, 82.2, the fiber preform 72, 72' slides between the first contact faces F80.1, F80.2, F80.2, F82.2 of the upstream and downstream secondary jaws and along the second contact face F80.1', F80.2' of the upstream secondary jaws 80.1, 80.2.

According to a second layout, the fiber preform 72, 72' is pre-impregnated with resin. According to one embodiment, at least one contact face F78, F80.1, F80.2, F80.2, F82.2, F80.1', F80.2' of the jaws 78, 80.1, 80.2, 82.1, 82.2 comprises a demolding film 94 limiting the risks of contamination of the fiber preform 72, 72' and facilitating the removal of the fiber preform where pre-impregnated with resin.

According to one arrangement, the contact face F78 of the main jaw 78 has a demolding film 94.

Each downstream secondary jaw 82.1, 82.2 has at least one moving belt 96 stretched between two pivoting rollers 98, 98' on the first contact face F82.1, F82.2 thereof. In operation, the moving belt 96 is in contact with the fiber preform 72, 72' and moves on the pivoting rollers 98, 98'. This moving belt 96 can be a demolding film or coated with a demolding film.

According to a first layout, the movement of the moving belt 96 is idle. In this case, by moving at the same movement speed as the fiber preform 72, 72' between the upstream and downstream secondary jaws, the moving belt 96 limits the friction between the fiber preform 72, 72' and the downstream secondary jaws 82.1, 82.2.

According to a second layout, the movement of the moving belt 96 is controlled, for example by setting at least one of the pivoting rollers 98, 98' to a given rotational speed. In this case, the moving belt 96 regulates the tractive force exerted on the fiber preform 72, 72'.

Each upstream secondary jaw 80.1, 80.2 has at least one moving belt 100 stretched between at least two pivoting rollers 102, 102' on the first and/or second contact face F80.1, F80.2, F80.1', F80.2' thereof. According to one layout, each upstream secondary jaw 80.1, 80.2 has a single moving belt 100 stretched between at least three pivoting rollers 102, 102', 102", the pivoting rollers being arranged such that the moving belt 100 moves on the first and second contact faces F80.1, F80.2, F80.1', F80.2'. In operation, the moving belt 100 is in contact with the fiber preform 72, 72' and moves on the three pivoting rollers 102, 102', 102".

According to a first layout, the movement of the moving belt 100 is idle. In this case, by moving at the same movement speed as the fiber preform 72, 72' between the upstream and downstream secondary jaws, the moving belt 100 limits the friction between the fiber preform 72, 72' and the upstream secondary jaws 80.1, 80.2.

According to a second layout, the movement of the moving belt 100 is controlled, for example by setting at least one of the pivoting rollers 102, 102', 102" to a given rotational speed. In this case, the moving belt 100 regulates the tractive force exerted on the fiber preform 72, 72'.

The invention is not limited to the embodiments described above. According to another embodiment illustrated in FIGS. 8 and 9, the invention can be used to manufacture a stiffened panel 104 comprising at least one flange 106 folded through 90°. This stiffened panel 104 comprises a main wall 108, such as a top or bottom panel or a front or rear spar for example, and the flange 106 forming an angle of approximately 90° with the main wall 108, the flange 106 being intended to be connected with another wall, such as a top or bottom panel or a front or rear spar for example, so as to form a portion of a box.

Figure 8:
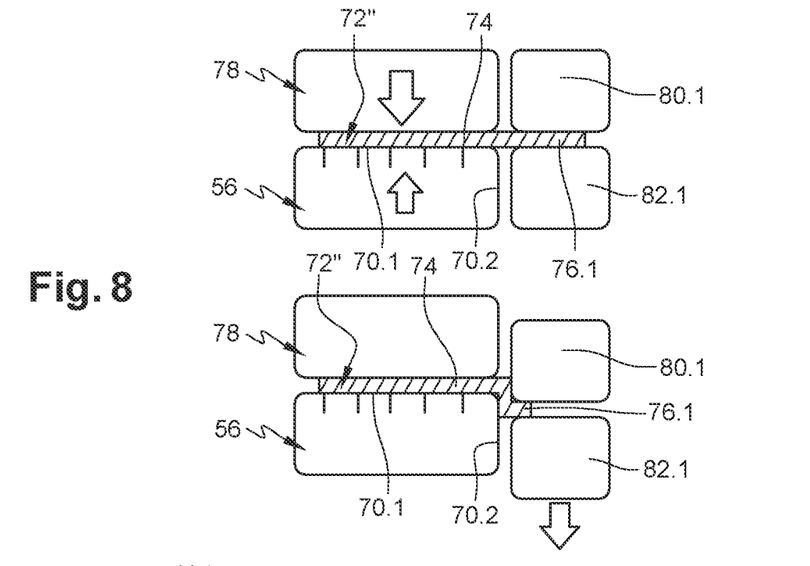
FIG. 8 is a schematic view of the different steps for positioning an outer skin showing another embodiment of the invention.
Figure 9:
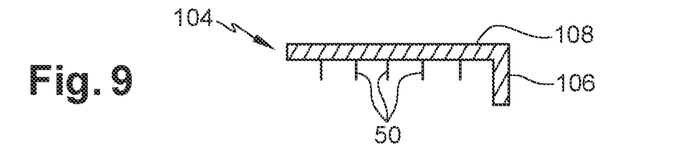
FIG. 9 shows a cross section of a stiffened panel obtained according to the embodiment shown in FIG. 8.

The main wall 108 has stiffening members 50 on one of the faces thereof. As before, this stiffened panel 104 is obtained from an outer skin made of composite material and from a plurality of sections made of composite material each having a joining face in contact with the outer skin; the method comprising a step of obtaining the sections, a step of positioning the sections on a face 70.1 of a mold 56, a step of obtaining a flat fiber preform 72" having a thickness substantially equal to the outer skin and a step of placing the fiber preform on the sections positioned on the first face 70.1 of the mold 56. The mold has a second side face 70.2 shaped like the flange 106, forming an angle of approximately 90° with the first face 70.1.

The fiber preform 72" includes a main portion 74 designed to be positioned on the first face 70.1 of the mold 56 and at least one lateral extension 76.1 designed to be positioned on the second side face 70.2 of the mold 56 after a forming step of the fiber preform 72'.

As before, for this forming step, the main portion 74 is held against the joining faces of the sections positioned on the first face 70.1 of the mold 56 by a main jaw 78 and the lateral extension 76.1 is positioned between a pair of secondary jaws 80.1, 82.1 designed to move in translation in at least one direction parallel to the second face of the mold 56. On completion of the translational movement of the pair of secondary jaws 80.1, 82.1, the lateral extension 76.1 is pressed against the second side face 70.2 of the mold 56.

Figure 11:
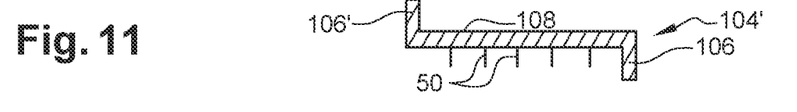
FIG. 11 shows a cross section of a stiffened panel obtained according to the embodiment shown in FIG. 10.

According to another embodiment, the stiffened panel 104' includes two flanges 106, 106'. These flanges 106, 106' form an angle of approximately 90° with the main wall 108. According to one arrangement, the flanges 106, 106' are folded in the same direction to obtain a U-shaped stiffened panel, or in opposite directions to obtain a Z-shaped stiffened panel 104', as shown in FIG. 11.

In order to obtain a flange 106' folded away from the stiffening members 50, the main jaw 78 has, in addition to the contact face F78, at least one lateral contact face 78.1 shaped like the flange 106' to be obtained. Where the stiffened panel 104' includes a single flange 106' folded away from the stiffening members 50, the main jaw 78 has a single lateral contact face 78.1. Where the stiffened panel includes two flanges folded away from the stiffening members 50, the main jaw 78 has two opposing side contact faces.

To obtain a stiffened panel 104' with two flanges 106, 106', the flat fiber preform 72''' comprises a main portion 74 intended to be positioned on the first face 70.1 of the mold 56 and the first and second lateral extensions 76.1, 76.2, on both sides of the main portion 74, the first lateral extension 76.1 being folded against one of the side faces 70.2 of the main mold 56 and the second lateral extension 76.2 being folded against one of the lateral contact faces 78.1 of the main jaw 78 during a forming step.

As before, for this forming step, the main portion 74 is held against the joining faces of the sections positioned on the first face 70.1 of the mold 56 by the main jaw 78.

According to a first procedure, during the forming step, each lateral extension 76.1, 76.2 is positioned between a pair of secondary jaws designed to move in translation in at least one direction parallel to the side face 70.2 of the mold 56 or to the lateral contact face 78.1 of the main jaw 78.

The two pairs of secondary jaws can move in translation in the same direction if the flanges 106, 106' are folded in the same direction, or in opposite directions if the flanges 106, 106' are folded in opposite directions to obtain a Z-shaped stiffened panel 104'.

Figure 10:
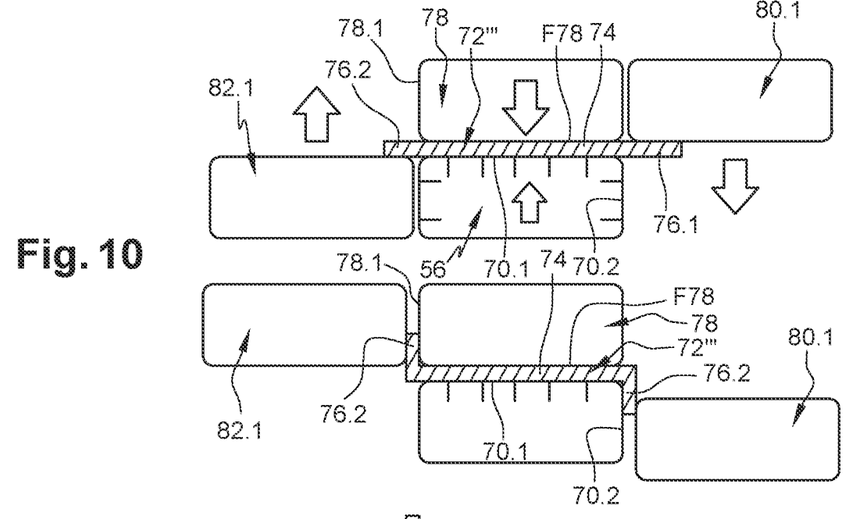
FIG. 10 is a schematic view of the different steps for positioning an outer skin showing another embodiment of the invention.

According to another simplified procedure shown in FIG. 10, for this forming step, the main portion 74 is held against the joining faces of the sections positioned on the first face 70.1 of the mold 56 by a main jaw 78.

Furthermore, each lateral extension 76.1, 76.2 is folded against a forming surface, specifically either the side face 70.2 of the mold 56 or the lateral contact face 78.1 of the main jaw 78, by means of an upstream secondary jaw 80.1, 82.1 that moves in translation in a direction of movement parallel to the forming surface by pushing the lateral extension 76.1, 76.2, the upstream secondary jaw 80.1, 82.1 being positioned upstream of the lateral extension 76.1, 76.2 in the direction of movement during the translational movement thereof. This upstream secondary jaw 80.1, 82.1 has a contact face oriented toward the forming surface and spaced apart from the forming surface by a distance substantially equal to the thickness of the flat fiber preform 72'''.

The faces of the upstream and/or downstream secondary jaws in contact with the fiber preforms 72", 72''' may include a demolding film and/or a moving belt, as in the embodiment shown in FIG. 6.

The manufacturing method according to the invention makes it possible to obtain a portion of a box structure comprising at least one stiffened main wall (such as a top or bottom panel or a front or rear spar) extended by at least one flange 106, 106' and/or at least one stiffened secondary wall (such as a top or bottom panel or a front or rear spar), the portion of a box structure being obtained from an outer skin 60 made of a composite material and a plurality of sections 52, 54 made of composite material each having a joining face in contact with the outer skin 60. This method comprises:

a step of obtaining the sections 52, 54,
a step of positioning the sections 52, 54 on a mold 56 comprising at least one first face 70.1 on which the sections 52, 54 are positioned,
a step of obtaining a flat fiber preform 72, 72', 72", 72''' having a thickness substantially equal to the outer skin 60,
a step of placing a central portion 74 of the fiber preform 72, 72', 72", 72''' on the sections 52, 54 positioned on the first face 70.1 of the mold 56, the fiber preform 72, 72', 72", 72''' having at least one lateral extension 76.1, 76.2 extending the central portion 74,
a step of forming at least one lateral extension 76.1, 76.2 of the fiber preform,
a step of applying at least one polymerization covering,
at least one polymerization step,
at least one demolding step.

During this forming step, the main portion 74 is held against the joining faces of the sections positioned on the first face 70.1 of the mold 56 by at least one main jaw 78. The contact face F78 of the main jaw 78 may include a demolding film.

The fact that the central portion 74 of the fiber preform is pressed against the sections positioned on the first face 70.1 of the mold 56 by the main jaw 78 enables a single lateral extension to be folded. Thus, the method according to the invention can be used to obtain stiffened panels with a single flange or a single stiffened secondary wall. According to another advantage, this optimizes the contact between the joining faces of the sections and the fiber preform.

During the forming step, at least one lateral extension 76.1, 76.2 of the fiber preform 72, 72', 72''' is folded against a forming surface, substantially perpendicular to the first face 70.1 of the mold 56 using at least one secondary jaw 80.1, 80.2, 82.1, 82.2 moving in translation parallel to the forming surface. According to the embodiments, the forming surface may be a side face 70.2, 70.3 of the mold 56, a contact face 78.1 of the main jaw 78 or the joining faces of the sections positioned on a side face 70.2, 70.3 of the mold 56. Folding at least one lateral extension 76.1, 76.2 by positioning the lateral extension between a pair of secondary jaws moving in translation parallel to the forming surface optimizes the deformation of the lateral extension 76.1, 76.2 by preventing the lateral extension from becoming detached from the forming surface on completion of the forming step.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing at least one portion of a box structure comprising at least one stiffened main wall extended by at least one of at least one flange or at least one stiffened secondary wall, said portion of the box structure being obtained from an outer skin made of a composite material and from a plurality of sections made of a composite material, each of the plurality of sections having a joining face in contact with the outer skin, said method comprising:
a step of obtaining the sections,
a step of positioning said sections on a mold comprising at least a first face on which the sections are positioned,
a step of obtaining a flat fiber preform having a thickness substantially equal to the outer skin,
a step of placing a central portion of the fiber preform on the sections positioned on the first face of the mold, the fiber preform having at least one lateral extension extending the central portion,
a step of forming the lateral extension,
a step of placing at least one polymerization covering, at least one polymerization step, and
at least one demolding step;
wherein during the forming step, the main portion is kept pressed against the joining faces of the sections positioned on the first face of the mold by at least one main jaw, and
wherein the lateral extension of the fiber preform is folded against a forming surface, substantially perpendicular to the first face of the mold, by means of at least one secondary jaw configured to move in translation parallel to the forming surface.

2. The method as claimed in claim 1, wherein during the forming step, the lateral extension of the fiber preform is held between a pair of secondary jaws configured to move in translation in at least one direction parallel to the forming surface.

3. The method as claimed in claim 1, wherein the fiber preform includes right- and left-hand lateral extensions positioned on both sides of the main portion.

4. The method as claimed in claim 1, wherein the forming surface corresponds to joining faces of sections positioned on a side face of the mold.

5. A method for manufacturing a central wingbox comprising a top panel, a bottom panel, a front spar and a rear spar, wherein the central wingbox comprises:
a first portion comprising the top panel, the front and rear spars, and the first and second flanges, the first flange being connected to the front spar, approximately perpendicular to said front spar and extending said front spar in a direction opposite the rear spar, the second flange being connected to the rear spar, approximately perpendicular to said rear spar and extending said rear spar in a direction opposite the front spar, said first portion being obtained using the manufacturing method as claimed in claim 1,
a second portion comprising a stiffened panel shaped like the bottom panel and including first and second extensions arranged on both sides of the bottom panel, the first extension being connected to the first flange, the second extension being connected to the second flange.

6. A central wingbox obtained using the manufacturing method as claimed in claim 5.

7. A forming tool for implementing the manufacturing method as claimed in claim 1 for at least one portion of a box structure comprising at least one stiffened main wall extended by at least one of at least one flange or at least one stiffened secondary wall, wherein the forming tool comprises:
a mold having at least a first face shaped like the stiffened main wall and configured to bear sections,
at least one main jaw comprising a contact face substantially parallel to the first face of the mold, configured to hold a main portion of a fiber preform pressed against sections positioned on the first face of the mold,
at least one secondary jaw configured to fold a lateral extension of the fiber preform against a forming surface and to move in at least one direction parallel to the forming surface.

8. A forming tool as claimed in claim 7, wherein the forming tool comprises at least one pair of upstream and downstream secondary jaws each configured to hold a lateral extension of the fiber preform and to move in a direction parallel to the forming surface.

9. The forming tool as claimed in claim 8, wherein each upstream and downstream secondary jaw comprises a first contact face, the first contact faces of the upstream and downstream secondary jaws, being configured to be arranged on both sides of the fiber preform, substantially parallel to each other for each pair and perpendicular to a face of the mold against which the lateral extension held by the upstream and downstream secondary jaws is to be positioned.

10. The tool as claimed in claim 9, wherein each upstream secondary jaw comprises a second contact face oriented towards the mold, substantially parallel to the face of the mold against which the lateral extension held by the upstream and downstream secondary jaws is to be positioned, in operation the second contact face being spaced apart from the sections positioned on said face of the mold by a distance substantially equal to the thickness of the fiber preform.

11. The forming tool as claimed in claim 10, wherein each downstream secondary jaw has at least one moving belt on the first contact face thereof.

12. The forming tool as claimed in claim 10, wherein each upstream secondary jaw has at least one moving belt on at least one of the first or second contact face thereof.

13. The forming tool as claimed in claim 12, wherein each upstream secondary jaw has a moving belt stretched between at least three pivoting rollers arranged such that the moving belt moves on the first and second contact faces.

14. The forming tool as claimed in claim 8, wherein the tool comprises a first pair of secondary jaws configured to cooperate with a right-hand lateral extension of the fiber preform and a second pair of secondary jaws configured to cooperate with a left-hand lateral extension of the fiber preform.

* * * * *